United States Patent [19]
Gardner

[11] 3,973,202
[45] Aug. 3, 1976

[54] PORTABLE ELECTRONIC SYSTEM FOR USE WITH A DIRECT CURRENT SOURCE HAVING A GROUND OF EITHER POSITIVE OR NEGATIVE POLARITY

[75] Inventor: John Gardner, Kansas City, Kans.

[73] Assignee: Trans-Comm Mfg. Inc., Leawood, Kans.

[22] Filed: May 16, 1975

[21] Appl. No.: 578,135

[52] U.S. Cl. .............................. 325/313; 320/26; 325/353; 325/354; 325/380; 343/715
[51] Int. Cl.² ............................................. H04B 1/06
[58] Field of Search .............................. 320/25, 26; 325/311–313, 353, 354, 377, 379, 380; 343/702, 713, 715

[56] References Cited
UNITED STATES PATENTS

| | | | |
|---|---|---|---|
| 2,002,844 | 5/1935 | Aceves et al. | 325/377 |
| 3,059,184 | 10/1962 | Germain | 325/312 |
| 3,071,728 | 1/1963 | Grace et al. | 325/312 |
| 3,230,533 | 1/1966 | Brill | 325/354 |
| 3,700,999 | 10/1972 | Gourse | 320/26 |

*Primary Examiner*—Robert L. Griffin
*Assistant Examiner*—Marc E. Bookbinder
*Attorney, Agent, or Firm*—Fishburn, Gold & Litman

[57] ABSTRACT

A portable system of electronic sound equipment for use in vehicles and the like having a direct current electrical system with either a positive or negative ground, wherein the equipment includes one or more of an AM/FM radio, a tape player, and a citizen's band transceiver wired for use with a negative ground, the system including an antenna having a shielded lead and a polarity inverter in the form of a diode bridge circuit and connections with the source of current and the ground therefor and connections to the equipment input and the equipment ground. The antenna lead shield is separated and the portion adjacent to the antenna is grounded to the bridge circuit through a capacitor whereby the connection of the equipment into the direct current electrical system is foolproof with the equipment being operative with such electrical system having either positive or negative ground.

10 Claims, 7 Drawing Figures

PORTABLE ELECTRONIC SYSTEM FOR USE WITH A DIRECT CURRENT SOURCE HAVING A GROUND OF EITHER POSITIVE OR NEGATIVE POLARITY

This invention relates to portable electronic equipment adapted to be connected to various sources of direct current and more particularly to such a portable system that may be operatively connected to direct current sources having either positive or negative polarity grounds.

Conventional vehicles, such as trucks, boats, and the like, have batteries for the source of the direct current for the electrical systems. Most of such vehicles have the 12-volt system arranged for the negative side to be grounded, however, some vehicles have the battery and circuitry arranged wherein the positive side is connected to the ground. Portable packages of electronic sound equipment and the like may be owned and/or carried with a vehicle operator, such as a truck driver, and when in the truck the equipment connected to the electrical system for the power supply of the equipment. Such portable packages may include one or more items, such as AM/FM radio, 8-track tape player, and citizen's band transceiver and it is customary for such equipment to be wired for use with a voltage source having a negative ground. The sound equipment can be specially arranged and wired for use with a voltage source having a positive ground, but that is expensive and such equipment could not be used with a source of current having a negative ground. In using portable sound equipment the user may move from a vehicle having a system with a negative ground to another vehicle having electrical system with a positive ground. In such instances, with conventional equipment the operator may connect the leads to an electrical system having the wrong polarity for the sound equipment with resulting damage thereto. With such portable equipment it is customary to have an antenna with a clamp or mounting so the antenna can also be moved from one vehicle to another, therefore, it is desirable that the antenna also have a simple connection to the equipment. Heretofore, such portable sound equipment has been usable only in vehicles having the current source with compatible ground polarity and it has been necessary for the user to carefully check the polarity of the vehicle system and any error could result in the expensive sound equipment being ruined.

The principal objects of the present invention are: to provide a portable system of electronic equipment which eliminates the possible polarity errors of connection to a vehicle current source; to provide such equipment that can be moved from one vehicle to another and connected to the direct current electrical system therein having a ground of either positive or negative polarity; to provide a portable package having one or more items of electronic sound equipment, such as an AM/FM radio, an 8-track tape player, and a citizen's band transceiver, wired for use with a voltage source having a negative ground with a polarity inverter circuit for connection between the source of D.C. voltage and the electronic equipment; to provide such a portable system with an antenna for removable mounting on a vehicle with a shielded lead interrupted by a separable connection and having the portion of shield adjacent the antenna isolated for direct current from the shield portion adjacent the equipment; to provide such a portable structure wherein the polarity inverter has a loop with diodes therein arranged to provide non-polarized input terminals and polarized output terminals; to provide such a portable system for connection to a direct current source without danger of error and damage to the equipment; to provide a portable system of electronic sound equipment for use in vehicles with a protective inverter and circuitry permitting connection to a current source having a ground with either negative or positive polarity and which is economical and durable in construction, foolproof in use, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment of the present invention and illustrate various objects and features thereof.

Figure 1:
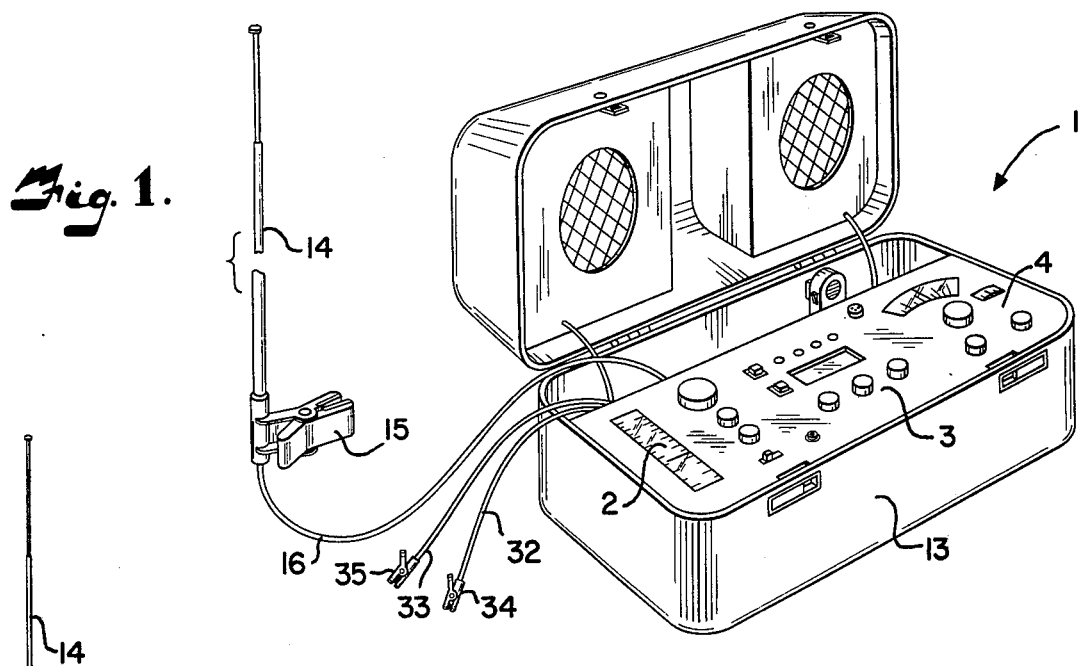
FIG. 1 is a perspective view of the portable system of sound equipment shown installed in a protective carrying case.
Figure 2:
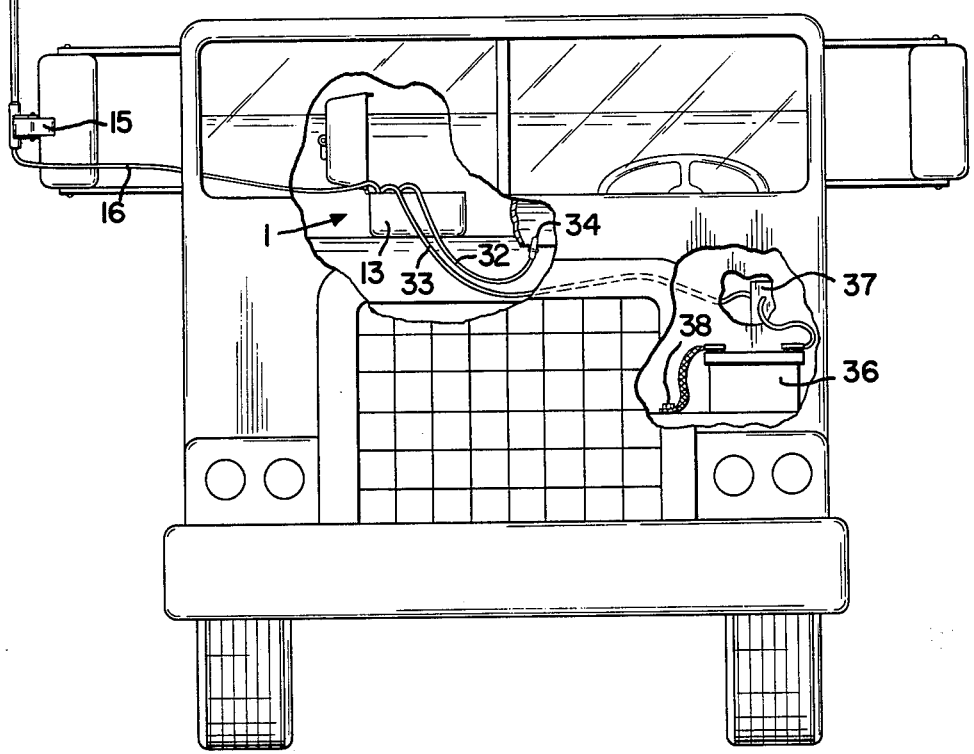
FIG. 2 is a front elevational view of a vehicle with portions broken away to illustrate the portable system operatively connected therein.
Figure 3:
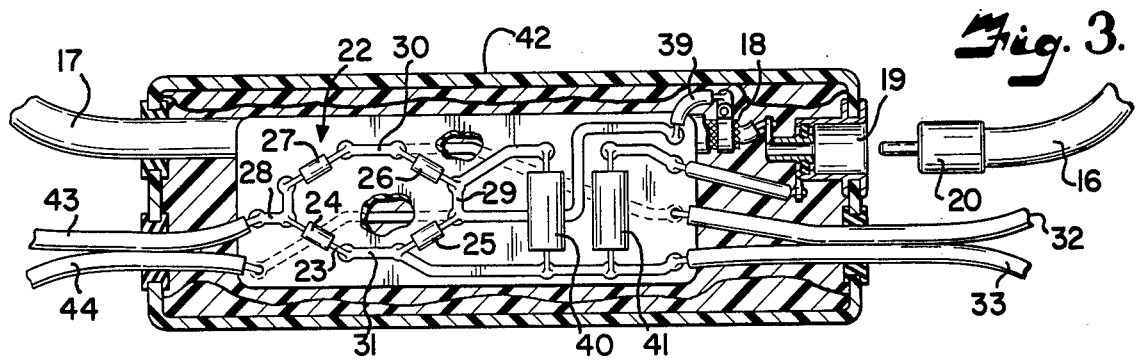
FIG. 3 is a longitudinal sectional view through the protector unit housing the polarity inverter and the antenna shield isolation means.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more in detail to the drawings:

In present day vehicles, such as trucks, boats and the like, it is common practice to have an electrical system with a direct current source, such as a battery arranged with a generator or alternator to provide a current supply for the electrical system and to maintain the battery in a charged condition. The most common electrical systems are 12-volts. While radios and the like may be permanently installed in vehicles, when a number of items of sound equipment are desired, more versatility is provided by having a portable package which can be moved from one vehicle to another with the user, as for example, present day over-the-highway trucks rarely have permanently installed radio equipment and the package of the present invention is designed for use by truck drivers and the like so that when they change from one truck to another they can have their own sound equipment for connection into the electrical system of the vehicle, such as trucks, boats and the like and have their own sound system as desired.

The portable system of sound equipment 1, may have one or more items of electronic sound equipment for example, an AM/FM radio 2, a tape player 3, such as a conventional 8-track tape player, and a citizen's band transceiver 4. The AM/FM radio 2 as an antenna terminal 5 and the citizen's band transceiver radio 4 has an antenna termimal 6. The items of equipment 2, 3 and 4 are conventional with the usual on and off switches, volume controls, etc. (not shown) and the items are wired for use with a direct current power supply having a negative ground. The AM/FM radio has a positive power terminal 7 and a negative ground terminal 8, the tape player 3 has a positive power terminal 9 and a negative ground terminal 10, and the citizen's band transceiver has a positive power terminal 11 and a negative ground terminal 12.

It is preferred that all of the items of equipment be supported in a carrying case 13 and the radios should have antennas when operated. The equipment therefore includes an elongate antenna 14 provided with a suitable clamp 15 adjacent the lower end thereof, adapted to clamp on an outside portion of the vehicle preferably adjacent a door or opening to the cab. The antenna has a shielded lead 16 to extend into the cab for suitable connection to the electronic equipment, which preferably would be located in a case positioned in the cab. To facilitate connection the antenna lead has a portion 17 connected to the antenna terminals 5 and 6 of the AM/FM radio 2 and the citizen's band transceiver 4 respectively. The antenna lead 17, having a shield 18 thereon, extends from the antenna terminals 5 and 6 to an antenna jack 19 whereby the antenna 14 may be disconnected as desired. In the illustrated structure, antenna lead 17 is connected to the inner connector of antenna jack 19, however, the shield 18 is not connected to the outer connector of antenna jack 19. Antenna lead 16, having a shield 20 thereon, is connected to the inner connector of an antenna plug 21 with the shield 20 connected to the outer connector of plug 21. When antenna plug 21 is inserted into antenna jack 19, antenna lead 16 is connected directly to lead position 17 and thereby to antenna terminals 5 and 6; however, shield 20 is not connected to shield 18 as will be explained later.

The portable system of electronic equipment is provided with protective circuitry 22 whereby the power input and ground may be connected into the D.C. voltage system of the vehicle and operate properly with the direct current source having a ground of either positive or negative polarity. The protective circuitry 22 includes a polarity inverter 23 including a loop having first, second, third and fourth diodes 24, 25, 26 and 27 respectively. The polarity inverter 23 is the conventional full-wave bridge rectifier configuration having a positive output terminal 28, a negative output terminal 29, and non-polarized input terminals 30 and 31. Because of the arrangement of diodes 24, 25, 26, and 27, the inverter 23 is operative to supply a direct current voltage output of the stated polarity regardless of the polarity of the input voltage.

The positive output terminal 28 is connected to the positive power terminals 7, 9, and 11 respectively of radio 2, tape player 3 and transciever 4. The negative output terminal 29 is connected to the negative ground terminals 8, 10, 12 of the respective devices. Input power conductors 32 and 33 are connected respectively to the non-polarized input terminals 30 and 31 at one end thereof. The other ends of conductors 32 and 33 have suitable connectors, respectively 34 and 35, thereon for connections to the vehicle voltage source. One input power conductor is connected to the "hot" side of the battery 36 as at the fusebox 37 of the vehicle. The other input power conductor is connected to the vehicle system ground 38 at any convenient place on the vehicle body.

In conventional mobile communication equipment wired for use in negative ground systems, the negative power terminal of the equipment serves as a ground terminal and the vehicle body serves as a ground system for the antenna, whereby electromagnetic interactions between the antenna and the vehicle body provide an input power to a receiver during the reception mode. In providing a system of radio reception and transmission equipment adapted for use with positive and negative ground voltage sources, it is necessary to provide an antenna ground system which is not affected by the D.C. polarity of the vehicle voltage source ground.

Since AM/FM radio 2 and citizen's band transceiver 4 are designed for use in negative ground systems, the negative ground terminals, respectively 8 and 12, are designated as voltage references for radio frequency signals as well as direct currents. Therefore, the shield portion 18 of antenna lead portion 17 is connected to the negative inverter output terminal 29, as at 39. A radio frequency path to the vehicle body is provided by capacitor 40 having one terminal connected to the negative inverter output terminal 29 and the other terminal connected to one of the non-polarized input terminals, for example terminal 31. In the event that terminal 31 is not connected directly to the vehicle ground, the ground path is provided through the battery 36 which easily conducts the interference frequencies to ground. The value of capacitor 40 is selected to pass the interference frequencies. In order to provide proper shielding to antenna lead 16, a capacitor 41 is connected between the outer connector of antenna jack 19 and the non-polarized input terminal to which capacitor 40 is connected, illustrated as terminal 31. The manner of selecting the value of capacitor 41 is the same as for capacitor 40.

It is preferred that the inverter loop 23, the antenna jack 19, and the capacitors 40 and 41 be located in a unitary structure and all incapsulated with suitable material to form a protector unit 42. With such a unit the conductors 32 and 33 with their terminals 34 and 35 respectively, extend from the unit casing and the antenna jack 19 is located so its opening is exposed for connection with the antenna plug 21. The antenna lead portion 17 with shield 18 thereon and a positive and a negative output power conductors, respectively 43 and 44, extend from the encasing unit 42 and are suitably connected to the respective positive power, negative ground, and antenna terminals of the equipment. With this arrangement and with the incapsulated unit in the carrying case, the case and antenna may be easily transported to a desired vehicle, the case placed in the cab, the antenna clamped to the outside of the vehicle with the shielded lead extending therein so that the plug can be connected. The vehicle electrical system as portions under the instrument panel, for example the fusebox 37, that is connected to the direct current source, the battery 36 to provide power, and the operator can connect one of the terminals, 34 or 35, to such connection and then connect the other terminal to a ground and the equipment is then ready for operation.

Figure 4:
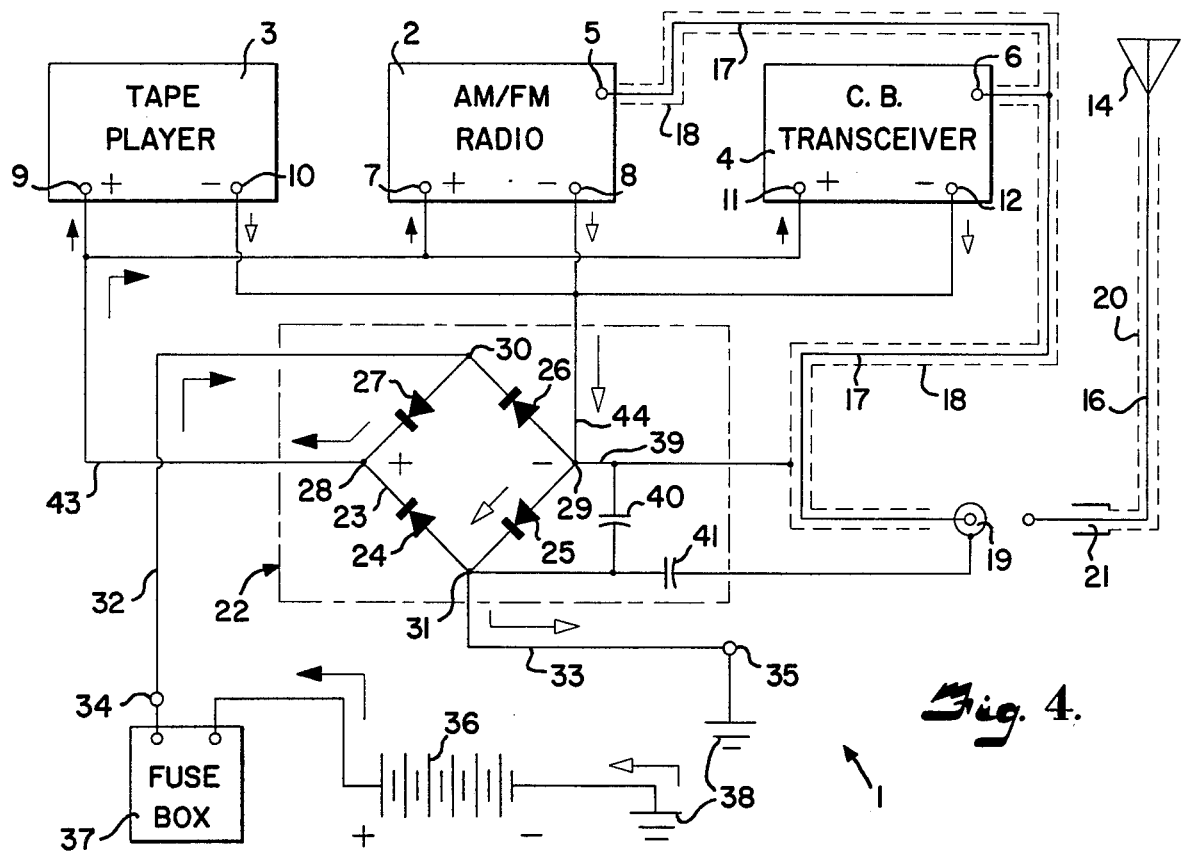
FIG. 4 is a schematic drawing showing a plurality of items of sound and communication equipment and antenna with arrows thereon showing current flow when connected to a D.C. voltage source having a negative ground.

In FIGS. 4, 5, 6, 7 arrows illustrate the flow of current from the battery 36 through the inverter 23 to the AM/FM radio 2, the tape player 3, and the citizen's band transceiver 4 and back to the battery 36. In FIG. 4, the input power conductor 32 is connected to the positive side of battery 36, which has the negative side grounded while input power conductor 33 is connected to the vehicle ground 38. Power current flows from the positive terminal of battery 36 through conductor 32 to input terminal 30, through diode 27 to positive inverter output terminal 28, through conductor 43 to the respective positive power terminals 7, 9, and 11 of the equipment. The return path is provided through conductor 44 from the respective negative ground terminals 8, 10 and 12 to negative inverter output terminal 29, through diode 25 to input terminal 31 through conductor 33 to the system ground 38. Interference frequency ground path is provided from shield 18 to inverter output terminal 29, through capacitor 40 to input terminal 31 which is grounded directly through conductor 33. Shielding for antenna lead 16 is provided by shield 20 connected to the outer connector of antenna plug 21 to the outer connector of antenna jack 19, through capacitor 41 to output terminal 31.

Figure 5:
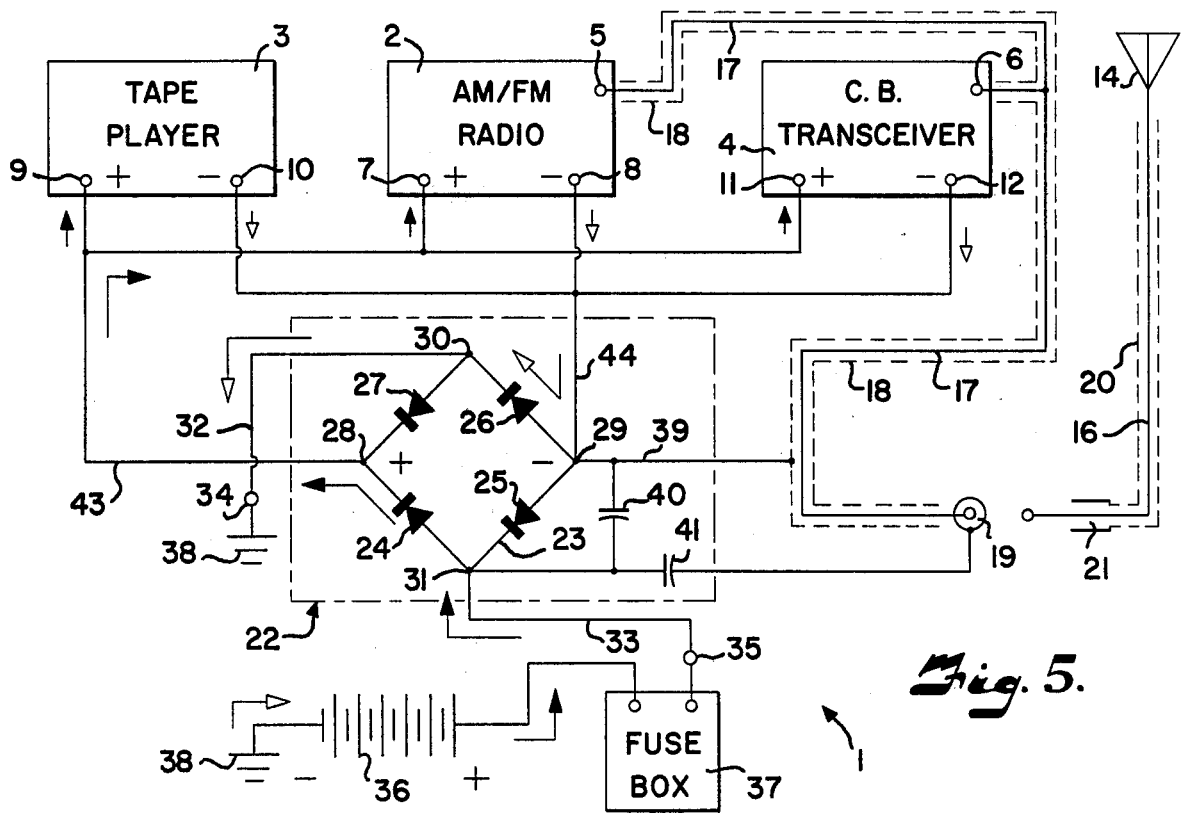
FIG. 5 is a schematic drawing similar to FIG. 4 with the equipment connected to a negative ground D.C. voltage source with the power input conductors reversed from the positions shown in FIG. 4.
Figure 6:
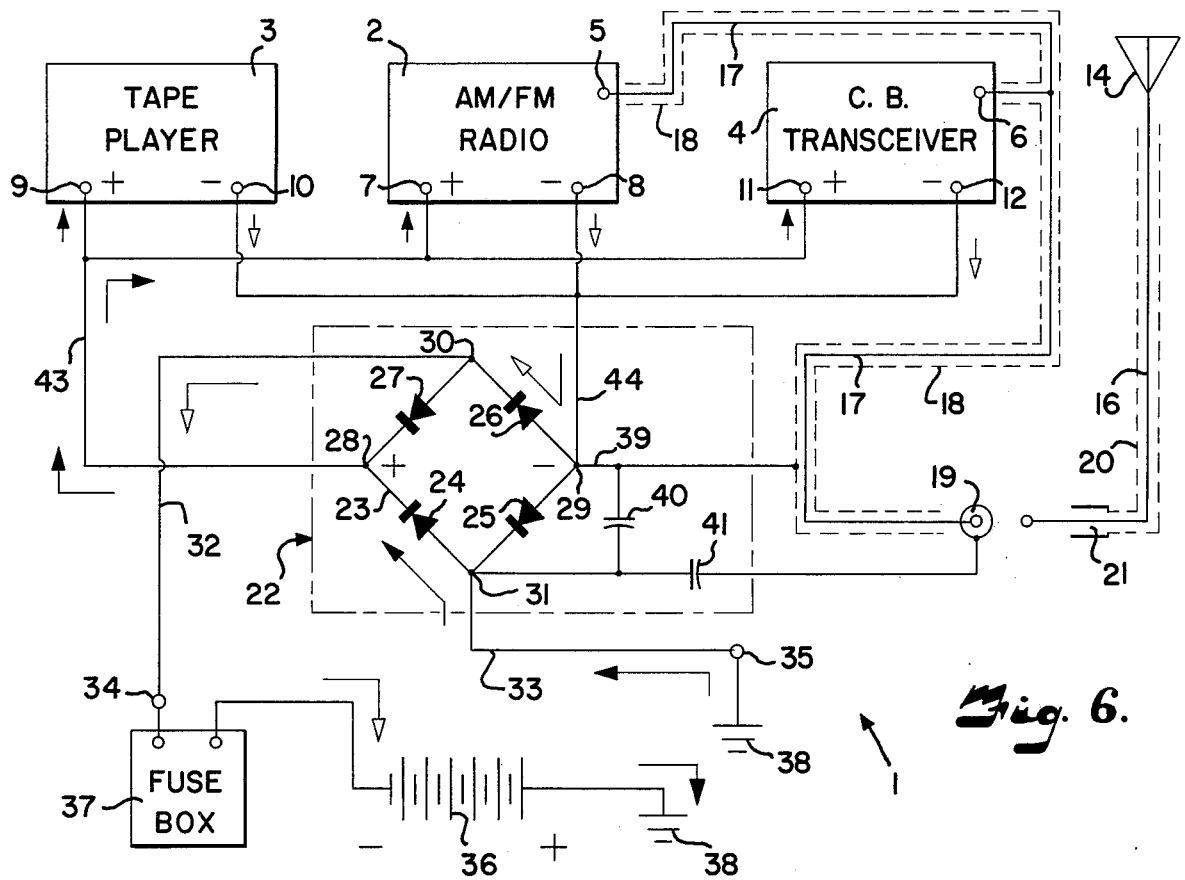
FIG. 6 is a schematic drawing similar to FIG. 4 with the equipment connected to a D.C. voltage source having a positive ground.

FIG. 5 also illustrates battery 36 as being negative grounded, however, power conductor 32 is connected to the vehicle ground 38 and conductor 33 is connected to the positive side of battery 36. Power current flows from the positive side of battery 36 through conductor 33 to the input terminal 31, through diode 24 to output terminal 28, and through conductor 43 to the respective positive power input terminals 7, 9, and 11. The return path is from negative ground terminals 8, 10, and 12 through conductor 44 to negative input terminal 29, through diode 26 to input terminal 30, and therefrom through conductor 32 to the system ground 38. The interference frequency ground path and shield connections for shield 20 to terminal 31 are similar to that illustrated in FIG. 4. From terminal 31 the interference frequency path to ground 38 is through conductor 33 to the positive side of battery 36, through battery 36 to the negative side thereof, and thus to ground 38.

FIG. 8 illustrates battery 36 as having the positive side grounded, and conductor 32 is connected to the negative side of battery 36 while conductor 33 is connected to the vehicle ground 38. Power current flows from the positive side of battery 36 to the system ground 38. From there it flows through conductor 33 to input terminal 31, through diode 24 to positive output terminal 28, and through conductor 43 to the respective positive power terminals 7, 9, and 11. The return path from the respective negative ground terminals 8, 10, and 12 is provided by conductor 44 to negative inverter input terminal 29, through diode 26 to input terminal 30, and therefrom through conductor 32 to the negative side of battery 36. The interference frequency ground path and shielding connections for shield 20 to terminal 31 are similar to that illustrated in FIG. 4. Terminal 31 is connected directly to the vehicle system ground 38 by conductor 33.

Figure 7:
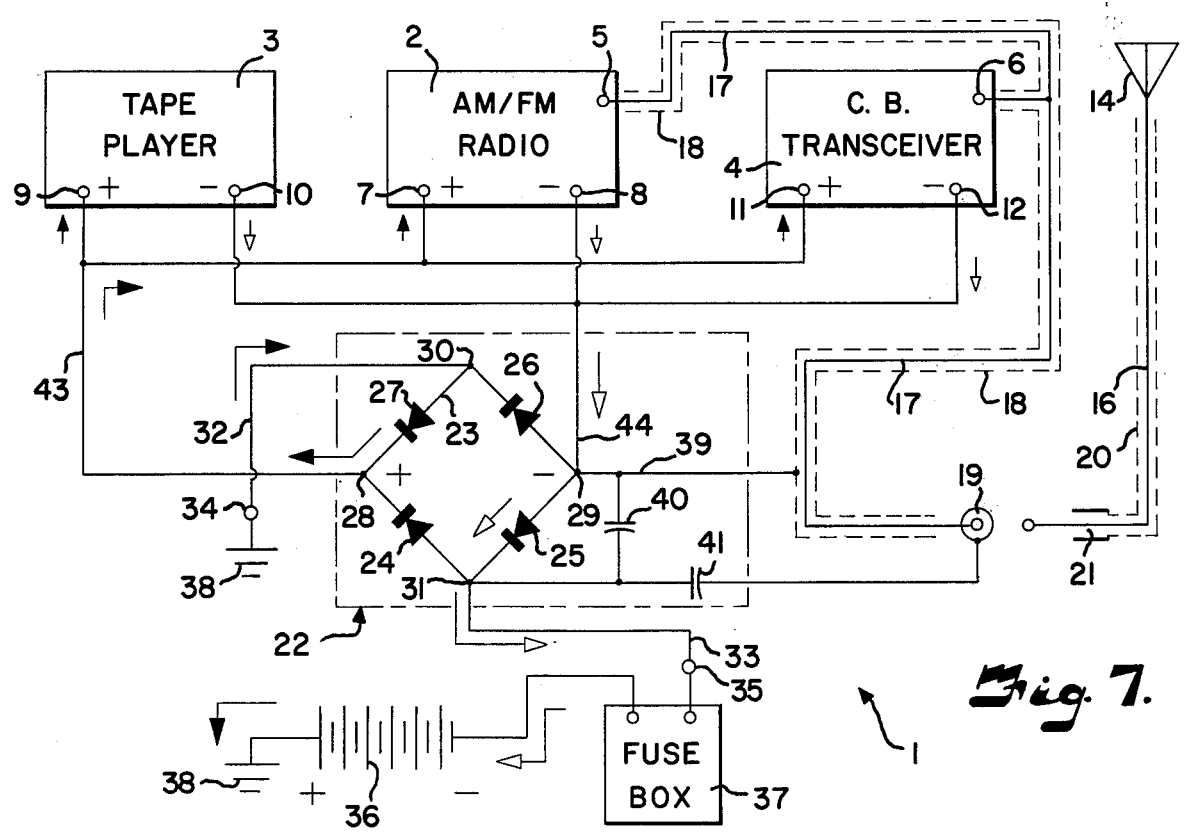
FIG. 7 is a schematic drawing similar to FIG. 6 with the equipment connected to a positive ground D.C. voltage source with the power input reversed from the positions shown in FIG. 6.

FIG. 7 also illustrates battery 36 as having the positive side connected to the system ground 38, however, conductor 33 is connected to the negative side of the battery 36 while conductor 32 is connected to the vehicle system ground 38. Power current flows from the positive side of battery 36 to the system ground 38 and therefrom through conductor 32 to input terminal 30. From there it flows through diode 27 to positive output terminal 28 and through conductor 43 to the respective positive power terminals 7, 9, and 11. The return path from the respective negative ground terminals 8, 10, and 12 is provided by conductor 44 to the negative inverter input terminal 29, through diode 25 to input terminal 31, and therefrom through connector 33 to the negative side of battery 36. The interference frequency ground path and shielding connections for shield 20 to terminal 31 are accomplished as in FIG. 4, and therefrom through conductor 33 to the negative side of battery 36, through battery 36 to the positive terminal thereof and from there to the vehicle system ground 38.

The illustrations of the possible connections of the system to the direct current source of the vehicle shows that with each, the equipment is properly supplied with current in a safe manner with no damage to the equipment and that this is true with the electrical system of a vehicle having a direct current source with a ground of either positive or negative polarity. Also the equipment is properly supplied even if the operator errs in connecting the terminals of the portable system into the electrical system of the vehicle, thereby providing a safe, positive, error proof arrangement facilitating the use of the portable system in various vehicles.

It is to be understood that while I have illustrated and described certain forms of my invention, it is not to be limited to these specific forms or arrangements of parts herein described and shown.

What I claim and desire to secure by Letters Patent is:

1. A portable system of electronic sound and/or communication equipment for use in vehicles having either a positive or negative ground direct current voltage source with one and an other terminals thereof, said system comprising:
    a. one or more items of electronic sound and/or communication equipment, each item having a positive and a negative power terminal, and certain items having an antenna terminal;
    b. an antenna for removably mounting on a vehicle in which the system is to be used;
    c. said antenna having a lead connectible to said antenna terminal, said antenna lead having a first shield portion adjacent said antenna and a separate second shield portion adjacent said electronic equipment and connected to the negative power terminal thereof;
    d. said system having one and an other power conductors connectible to said vehicle voltage source terminals for supplying direct current to the electronic equipment;
    e. a polarity inverter means having one and an other non-polarized input terminals and having a positive and a negative output terminals;
    f. each of said items having said positive and said negative power terminals connected respectively to said inverter positive and negative output terminals;

g. said one and said other power conductors connected irrespectively to said one and said other non-polarized inverter input terminals;

h. an antenna lead shield isolation means having a first terminal connected to said first shield portion, a second terminal connected to one of said non-polarized inverter input terminals, and a third terminal connected to said negative inverter output terminal.

2. A portable system of electronic sound and/or communication equipment for use in vehicles as set forth in claim 1 wherein said polarity inverter means comprises:
   a. first, second, third, and forth diodes connected in a loop, each of said diodes having an anode and a cathode;
   b. said first and said fourth diodes having the cathodes thereof connected together, the connection therebetween being said positive inverter output terminal;
   c. said second and said third diodes having the anodes thereof connected together, the connection therebetween being said negative inverter output terminal;
   d. said first diode anode being connected to said second diode cathode, the connection therebetween being one of said non-polarized inverter input terminal; and
   e. said third diode cathode being connected to said fourth diode anode, the connection therebetween being the other of said non-polarized inverter input terminal.

3. A portable system of electronic sound and/or communication equipment for use in vehicles as set forth in claim 2 wherein said antenna lead shield isolation means comprises:
   a. a first capacitor of a value selected to pass interference frequency signals having opposite terminals, said first capacitor connected between said first antenna shield portion and one of said non-polarized inverter input terminals; and
   b. a second capacitor of a value selected to pass interference frequency signals having one terminal thereof connected to said negative inverter output terminal and having the other terminal thereof connected to one of said first capacitor opposite terminals.

4. A portable system of electronic sound and/or communication equipment for use in vehicles as set forth in claim 3 and including:
   a. a carrying case providing a mounting structure for said items, said polarity inverter means, and said first and second capacitors;
   b. said carrying case having said one and said other power conductors extending therefrom for connection to said vehicle voltage source;
   c. said carrying case having mounted thereon an antenna jack having a first and a second connector portions thereof;
   d. said first jack connector portion and said antenna terminal having a shielded antenna conductor connected therebetween, with the shield of said antenna conductor being connected to said negative inverter output terminal;
   e. said second jack connector portion and one of said non-polarized inverter input terminals having said first capacitor connected therebetween;
   f. said antenna having one end of a shielded antenna lead connected thereto, the other end of said antenna lead having an antenna plug thereon, said antenna plug having a first and a second connector portions thereof compatible with respective connector portions of said antenna jack; and
   g. said first plug connector portion being connected to said antenna lead and said second plug connector portion being connected to said antenna lead shield.

5. In a portable system of electronic sound and/or communication equipment wired for use in vehicles having a negative ground direct current electrical system, said portable system having a positive power terminal, a negative power terminal, and an antenna terminal, said portable system having for use therewith an antenna mountable on the vehicle in which the equipment is to be used, said vehicle having a voltage source with a ground of either positive or negative polarity, said antenna having a shielded lead terminating in a plug having a plug lead connector and a plug shield connector, a power polarity inverter and antenna lead shield direct current insolation module comprising:
   a. a housing providing a mounting structure for a power polarity inverter means and an antenna shield insolation means;
   b. said power polarity inverter means having a positive and a negative output terminals and having one and an other non-polarized input terminals;
   c. said housing having one and an other power conductors extending therefrom, said power conductors having one ends thereof connected to said inverter non-polarized input terminals within said housing and having the other ends thereof connectible to the terminals of said vehicle voltage source;
   d. said housing having mounted thereon an antenna jack having an antenna jack lead and shield connectors thereof;
   e. said housing having a positive and a negative output conductors extending therefrom, said output conductors having one ends thereof connected respectively to said inverter positive and negative output terminals within said housing and having the other ends thereof connectible respectively to said sound equipment positive and negative power terminals;
   f. said housing having a shielded antenna conductor extending therefrom, said antenna conductor having one end thereof connected to said antenna jack lead connector and having the other end thereof connectible to said equipment antenna terminal, said antenna conductor shield having one end thereof connected to said negative inverter output terminal; and
   g. said antenna lead shield isolation means being a first and a second capacitors, said first capacitor having opposite terminals and being connected between said antenna jack shield connector and one of said non-polarized inverter input terminals, and said second capacitor having one end connected to said negative inverter output terminal and the other end connected to one of said first capacitor opposite terminals.

6. A portable system of electronic sound and/or communication equipment for use in vehicles as set forth in claim 5 wherein said power polarity inverter means comprises:
   a. first, second, third and fourth diodes connected in a loop, each of said diodes having an anode and a cathode;

b. said first and said fourth diodes having the cathodes thereof connected together, the connection therebetween being said positive inverter output terminal;

c. said second and said third diodes having the anodes thereof connected together, the connection therebetween being said negative inverter output terminal;

d. said first diode anode being connected to said second diode cathode, the connection therebetween being one of said non-polarized inverter input terminals; and e. said third diode cathode being connected to said fourth diode anode, the connection therebetween being the other of said non-polarized inverter input terminals.

7. A portable system of electronic sound and/or communication equipment for use in vehicles as set forth in claim 6 wherein:
   a. said equipment antenna terminal is an equipment antenna jack having a lead portion and a shield portion;
   b. said negative power terminal is identical with said equipment antenna jack shield portion;
   c. said shielded antenna conductor other end has thereon a plug compatible with said equipment antenna jack, said antenna conductor plug having a lead portion thereof connected to said antenna conductor and having a shield portion thereof connected to the shield thereof, said antenna conductor plug lead and shield portions connectible respectively to said lead and shield portions of said equipment antenna jack.

8. A power polarity inverter and antenna lead shield direct current isolation circuit for use with a portable system of electronic sound and/or communication equipment wired for use in vehicles having a negative ground direct current electrical system, said portable system having a positive power terminal, a negative ground terminal, and an antenna terminal, said portable system having for use therewith an antenna mountable on the vehicle in which the equipment is to be used, said vehicle having a voltage source with one and another source terminals of opposite polarities, said vehicle having a ground of either positive or negative polarity, said antenna having a shielded lead terminating in a plug having a plug lead connector and a plug shield connector, said circuit comprising:
   a. a power polarity inverter means having first, second, third, and fourth diodes connected in a loop, each of said diodes having an anode and a cathode, said first and fourth diodes having the cathodes thereof connected together forming a positive inverter output terminal, said second and third diodes having the anodes thereof connected together forming a negative inverter output terminal, said first diode anode being connected to said second diode cathode forming one non-polarized inverter input terminal, and said third diode cathode being connected to said fourth diode anode forming another non-polarized inverter input terminal;
   b. an antenna jack having a jack lead connector and a jack shield connector, said antenna jack adapted to receive therein said antenna plug;
   c. a first capacitor of a value selected to pass interference frequency signals having opposite terminals and connected between said antenna jack shield connector and one of said non-polarized inverter input terminals;
   d. said non-polarized inverter input terminals being connectible to said vehicle voltage source terminals;
   e. said positive and said negative inverter output terminals being connectible respectively to said positive power terminal and said negative ground terminal; and
   f. said antenna jack lead connector being connectible to said portable system antenna terminal.

9. The power polarity inverter and antenna lead shield direct current isolation circuit as set forth in claim 8 and including:
   a. a totally incapsulated housing providing a mounting structure for said polarity inverter means, said first capacitor, and said antenna jack;
   b. said housing having one and an other power conductors extending therefrom, said power conductors having the one ends thereof connected within said housing respectively to said one and said other non-polarized inverter input terminals, and having the other ends thereof connectible respectively to said one and said other vehicle voltage source terminals;
   c. said housing having a positive and a negative output conductors extending therefrom, said positive and said negative output conductors having the one ends thereof connected within said housing respectively to said positive and said negative inverter output terminals, and having the other ends thereof connectible respectively to said positive power terminal and said negative ground terminal; and
   d. said housing having a shielded antenna conductor extending therefrom, said antenna conductor having one end thereof connected to said antenna jack lead connection within said housing and having the other end thereof connectible to said portable system antenna terminal, said antenna conductor shield having one end connected within said housing to said negative inverter output terminal and the other end thereof connectible to said negative ground terminal.

10. The power polarity inverter and antenna lead shield direct current isolation circuit as set forth in claim 9 wherein:
   a. said antenna terminal is an equipment antenna jack having a lead portion and a shield portion and said negative ground terminal is identical with said equipment antenna jack shield portion;
   b. said antenna conductor other end has thereon a plug compatible with said equipment antenna jack, said antenna conductor plug having a lead portion thereof connected to said antenna conductor and having a shield portion thereof connected to said antenna conductor shield.

* * * * *